United States Patent [19]

Bayley et al.

[11] Patent Number: 5,397,671
[45] Date of Patent: Mar. 14, 1995

[54] PROCESSES FOR PREPARING CROSSLINKED RESINS AND TONER COMPOSITIONS THEREFROM

[75] Inventors: Robert D. Bayley, Fairport; Carol A. Fox, Farmington; Thomas R. Hoffend, Webster, all of N.Y.

[73] Assignee: Xerox Corporation, Stamford, Conn.

[21] Appl. No.: 194,438

[22] Filed: Feb. 10, 1994

[51] Int. Cl.$^6$ .......................... G03G 9/00; C08L 67/08
[52] U.S. Cl. ..................................... 430/109; 528/272;
528/296; 528/297; 528/300; 528/301; 528/303;
528/306; 528/308; 528/308.6; 528/480;
528/491; 528/503; 525/437; 525/445; 525/447;
525/449; 522/3; 522/6; 522/24; 522/60;
522/101; 522/102; 522/104; 430/137
[58] Field of Search ............... 528/272, 296, 297, 300,
528/301, 303, 306, 308, 308.6, 480, 491, 503;
525/437, 447, 449, 445; 522/24, 62, 102, 104, 3,
6, 60, 101; 430/109, 137

[56] References Cited

U.S. PATENT DOCUMENTS

| | | | |
|---|---|---|---|
| 3,590,000 | 6/1971 | Palermiti et al. | 252/62.1 |
| 3,681,106 | 8/1972 | Burns et al. | 117/17.5 |
| 3,876,736 | 4/1975 | Takiura | 264/40 |
| 4,089,917 | 5/1978 | Takiura et al. | 264/40.3 |
| 4,894,308 | 1/1990 | Mahabadi et al. | 430/137 |
| 4,973,439 | 11/1990 | Chang et al. | 264/101 |
| 4,990,293 | 5/1991 | Macosko et al. | 264/40.1 |
| 5,057,392 | 10/1991 | McCabe et al. | 430/109 |
| 5,227,460 | 7/1993 | Mahabadi et al. | 528/272 |
| 5,352,556 | 10/1994 | Mahabadi et al. | 430/109 |

Primary Examiner—Samuel A. Acquah
Attorney, Agent, or Firm—John L. Haack

[57] ABSTRACT

A reactive melt mixing process for preparing toner resin, comprising: melting a reactive base resin, thereby forming a polymer melt; adding to said polymer melt a free radical initiator compound and optionally a vinyl monomer compound to form a second melt; and heating and mixing under high shear said second melt with optional addition of a vinyl monomer compound to form a partially crosslinked and partially gelled toner resin.

35 Claims, 4 Drawing Sheets

PROCESSES FOR PREPARING CROSSLINKED RESINS AND TONER COMPOSITIONS THEREFROM

CROSS REFERENCE TO COPENDING APPLICATIONS AND ISSUED PATENTS

Attention is directed to commonly owned and assigned copending applications: U.S. Ser. No. 07/814,641 (D/9 1117) filed Dec. 30, 1991, entitled "Reactive Melt Mixing Process for Preparing Crosslinked Toner Resin"; U.S. Ser. No. 08/035,609 (D/91117D) filed Mar. 23, 1993, entitled "Reactive Melt Mixing Process For Preparing Crosslinked Toner Resin"; U.S. Ser. No. 08/035,398 (D/91117QD) filed Mar. 23, 1993, entitled "Crosslinked Toner Resins Formed by Reactive Melt Mixing"; U.S. Ser. No. 08/159,176 (D/92555) filed Nov. 30, 1993, entitled "Unsaturated Polyesters"; and U.S. Ser. No. 08/131,250 (D/92556) filed Oct. 4, 1993, entitled "Melt Mixing Processes".

Attention is directed to commonly owned and assigned U.S. Pat. No. 5,227,460, U.S. Ser. No. 07/814,782 (D/91117Q) filed Dec. 30, 1991, entitled "Crosslinked Toner Resins".

BACKGROUND OF THE INVENTION

The present invention is generally directed to processes for the preparation of toner resins and toners. More specifically, the present invention relates to melt mixing processes, batch or continuous, but preferably continuous processes such as, for example, reactive extrusion for preparing crosslinked toner resins. The present invention also relates to processes for crosslinking reactive linear resins for the preparation of crosslinked toner resins that can be selected for application in heat fixable toners with superior fusing and vinyl offset performance.

Toner utilized in development in the electrographic process is generally prepared by mixing and dispersing a colorant and a charge enhancing additive into a thermoplastic binder resin, followed by micropulverization. As the thermoplastic binder resin, numerous polymers are known, including polystyrenes, styrene-acrylic resins, styrene-methacrylic resins, polyesters, epoxy resins, acrylics, urethanes and copolymers thereof. As the colorant, carbon black, magnetite and various colored pigments may be selected, and as the charge enhancing additive, alkyl pyridinium halides, distearyl dimethyl ammonium methyl sulfate, metallic alkyl salicylates, and the like are known.

To fix the toner to a support medium, such as a sheet of paper or transparency, hot roll fixing is commonly used. In this method, the support medium carrying a toner image is transported between a heated fuser roll and a pressure roll, with the image face contacting the fuser roll. Upon contact with the heated fuser roll, the toner melts and adheres to the support medium, forming a fixed image. Such a fixing system is very advantageous in heat transfer efficiency and is especially suited for high speed electrophotographic processes.

Fixing performance of the toner can be characterized as a function of temperature. The lowest temperature at which the toner adheres to the support medium is called the Cold Offset Temperature (COT), and the maximum temperature at which the toner does not adhere to the fuser roll is called the Hot Offset Temperature (HOT). When the fuser temperature exceeds HOT, some of the molten toner adheres to the fuser roll during fixing and is transferred to subsequent substrates containing developed images, resulting for example in blurred or extraneous images. This undesirable phenomenon is called offsetting. Between the COT and HOT of the toner, is the Minimum Fix Temperature (MFT) which is the minimum temperature at which acceptable adhesion of the toner to the support medium occurs, as determined by, for example, a creasing test. The difference between MFT and HOT is called the Fusing Latitude.

The hot roll fixing system and a number of toners used therein, however, exhibit several problems. First, the binder resins in the toners can require a relatively high temperature in order to be affixed to the support medium. This may result in high power consumption, low fixing speeds, and reduced life of the fuser roll and fuser roll bearings. Second, offsetting phenomena can be a problem. Third, toner containing vinyl type binder resins such as styrene-acrylic resins may have an additional problem known as vinyl offset. Vinyl offset occurs when a sheet of paper or transparency with a fixed toner image comes in contact for a period of time with, for example, a polyvinyl chloride (PVC) surface containing a plasticizer used in making the vinyl material flexible such as, for example, in vinyl notebook binder covers, and the fixed image adheres to the PVC surface.

Thus, there remains a need for toner resins with low fix temperature and high offset temperature and broad fusing latitude, superior or nonexistent vinyl offset property, and efficient and economic processes for the preparation of such resins.

In order to prepare lower fix temperature resins for toner, the molecular weight of the resin may be lowered. Low molecular weight and amorphous polyester resins and epoxy resins have been used to prepare low temperature fixing toners. For example, attempts to produce toners utilizing polyester resins as binder are disclosed in U.S. Pat. No. 3,590,000 to Palermiti et al. and U.S. Pat. No. 3,681,106 to Burns et al. The minimum fixing temperature of polyester binder resins can be rendered lower than that of other materials, such as styrene-acrylic resins. However, this may lead to a lowering of the hot offset temperature and, as a result, decreased offset resistance. In addition, the glass transition temperature of the resin may be decreased, which may cause the undesirable phenomenon of blocking of the toner during storage.

To prevent fuser roll offsetting and to increase fusing latitude of toners, modification of the binder resin structure by conventional polymerization processes, for example, by branching, crosslinking, and the like, has been attempted. For example, in U.S. Pat. No. 3,681,106 to Burns et al., a process is disclosed whereby a polyester resin was improved with respect to offset resistance by non-linearly modifying the polymer backbone by mixing a trivalent or more polyol or polyacid with the monomer to generate branching during polycondensation. However, an increase in degree of branching may result in an elevation of the minimum fix temperature. Thus, any initial advantage of low temperature fix may be diminished.

Another method of improving offset resistance is by crosslinking during polymerization. In U.S. Pat. No. 3,941,898 to Sadamatsu et al., for example, a crosslinked vinyl type polymer prepared using conventional crosslinking was used as the binder resin. Similar disclosures for vinyl type resins are presented in U.S. Pat. No. Re.

31,072 (a reissue of U.S. Pat. No. 3,938,992) to Jadwin et al., U.S. Pat. No. 4,556,624 to Gruber et al., U.S. Pat. No. 4,604,338 to Gruber et al., and U.S. Pat. No. 4,824,750 to Mahalek et al. Also, disclosures have been made of crosslinked polyester binder resins using conventional polycondensation processes for improving offset resistance, such as for example in U.S. Pat. No. 3,681,106 to Burns et al.

While significant improvements can be obtained in offset resistance and entanglement resistance, a major drawback may ensue with crosslinked resins prepared by conventional polymerization, for example, vinyl type processes including solution, bulk, suspension and emulsion polymerizations and polycondensation processes. In all of these processes, monomer and crosslinking agent are added to the reactor at the same time. The crosslinking reaction is not very fast and chains can grow in more than two directions at the crosslinking point by the addition of monomers. Three types of polymer configurations are produced—a linear and soluble portion called the linear portion, a crosslinked portion which is low in crosslinking density and therefore is soluble in some solvents, such as, tetrahydrofuran, toluene, and the like, and is called sol, and a portion comprising highly crosslinked gel particles which is not substantially soluble in any solvent, for example, tetrahydrofuran, toluene and the like, and is called gel. The second portion with low crosslinking density (sol) is responsible for widening the molecular weight distribution of the soluble part which results in an elevation of the minimum fixing temperature of the toner. Also, a drawback of these processes, which are not carried out under high shear, is that as more crosslinking agent is used the gel particles or very highly crosslinked insoluble polymer with high molecular weight increase in size. The large gels can be more difficult to disperse pigment in, causing unpigmented toner particles during pulverization, and toner developability may thus be hindered. Also, in the case of vinyl polymers, the toners produced often show vinyl offset.

In U.S. Pat. No. 4,533,614 to Fukumoto et al., a process was utilized for preparing loosened crosslinked polyester binder resin which showed low temperature fix and good offset resistance. Metal compounds were used as crosslinking agents. Similar disclosures are presented in U.S. Pat. No. 3,681,106 to Burns et al. and Japanese Laid-open Patent Applications Nos. 94362/1981, 116041/1981 and 166651/1980. As discussed in the '614 patent, incorporation of metal complexes, however, can influence unfavorably the charging properties of the toner. Also, in the case of color toners other than black, for example cyan, metal complexes can adversely affect the color of the pigments. It is also known that metal containing toner can have disposal problems in some areas, such as in the State of California, U.S.A. Metal complexes are often also expensive materials.

Reactive extrusion processes for producing engineering plastics are known, for both initial polymerization reactions employing monomers or prepolymers, and for polymer modifying reactions, such as graft, coupling and degradation reactions. However, it is believed that the prior art does not disclose the use of a reactive extrusion process to prepare crosslinked thermoplastic resins for use in toners.

In U.S. Pat. No. 4,894,308 to Mahabadi et al. and U.S. Pat. No. 4,973,439 to Chang et al., for example, extrusion processes are disclosed for preparing electrophotographic toner compositions in which pigment and charge control additive were dispersed into the binder resin in the extruder. However, in each of these patents, there is no suggestion of a chemical reaction occurring.

An injection molding process for producing crosslinked synthetic resin molded articles is disclosed in U.S. Pat. No. 3,876,736 to Takiura in which polyolefin or polyvinyl chloride resin and crosslinking agent was mixed in an extruder, and then introduced into an externally heated reaction chamber outside the extruder wherein the crosslinking reaction occurred at increased temperature and pressure, and at low or zero shear.

In U.S. Pat. No. 4,089,917 to Takiura et al., an injection molding and crosslinking process is disclosed in which polyethylene resin and crosslinking agent were mixed in an extruder and reacted in reaction chambers at elevated temperature and pressure. Heating of the resin mixture occurred partially by high shear in inlet flow orifices. However, the crosslinking reaction still took place in the reaction chambers at low or zero shear, and the final product is a thermoset molded part, and thus, is not useful for thermoplastic toner resins.

A process for dispensing premixed reactive precursor polymer mixtures through a die for the purposes of reaction injection molding or coating is described in U.S. Pat. No. 4,990,293 to Macosko et al. in which polyurethane precursor systems were crosslinked in the die and not in the extruder. The dimensions of the die channel were determined such that the value of the wall shear stress was greater than a critical value in order to prevent gel buildup and consequent plugging of the die. The final product is a thermoset molded part, and thus, is not useful for thermoplastic toner resins.

The processes disclosed in U.S. Pat. Nos. 3,876,736, 4,089,917, and 4,990,293 are not considered reactive extrusion processes, since, for example, the crosslinking occurs in a die or a mold, and not in an extruder. These processes are for producing engineering plastics such as thermoset materials which cannot be remelted once molded, and thus are not suitable for toner application.

SUMMARY OF THE INVENTION

Embodiments of the present invention overcome the above-discussed problems in the prior art. The present invention provides a reactive melt mixing process to produce low cost and safe crosslinked thermoplastic binder resins for toner compositions which have low fix temperatures and high offset temperatures, and which show minimized or substantially no vinyl offset. In this process, unsaturated base resins or polymers are crosslinked in the molten state under high temperature and high shear conditions, in for example an extruder, producing substantially uniformly dispersed microgels with controlled crosslinking density, preferably using a mixture comprised of a free radical initiator as a crosslinking initiator, a low molecular weight unsaturated or vinyl monomer compound as a crosslinking agent or spacer, and optionally an unreactive diluent compound, hereafter referred to as the diluent resin or wax, to moderate the initiation behavior and affect of the free radical initiator compound, and which process provides crosslinked product resin with minimized or no residual initiator or monomer material remaining in the resin after the high temperature and high shear reactive extrusion crosslinking.

The present invention provides an economical, robust and reproducible processes for preparing resins for toner, by batch or continuous processes. In embodiments of the present invention, crosslinking is accomplished quickly to form microgel particles during melt mixing. High shear conditions disperse resultant microgels substantially uniformly in the polymer melt and prevent the microgels from continuing to increase in size with increasing degree of crosslinking.

In embodiments of the present invention, a reactive resin, hereinafter referred to as base resin, for example, an unsaturated linear polyester resin, is crosslinked in the molten state under high temperature and high shear conditions, preferably using a free radical initiator, for example, an organic peroxide, as a crosslinking initiator in the presence of a vinyl monomer crosslinking agent or spacer, in a batch or continuous melt mixing device, without forming any significant amounts of residual materials. Thus, the removal of byproducts or residual unreacted materials is minimized or eliminated in embodiments of the present invention. In other embodiments of the process, the base resin and free radical initiator, or unreactive resin or wax diluted free radical initiator, are preblended and fed to a melt mixing device such as an extruder at an upstream location, or the base resin and initiator are each fed separately to the melt mixing device, for example, an extruder at either upstream or downstream locations. In an extruder screw configuration, extruder length and temperature control may be used to enable the initiator to be well dispersed in the polymer melt before the onset of crosslinking, and further, which provide a sufficient, but short, residence time for the crosslinking reaction to be accomplished. Adequate temperature control enables the crosslinking reaction to be carried out in a highly controllable and reproducible fashion. Extruder screw configuration and length can also provide high shear conditions that distribute microgels, formed during the crosslinking reaction, well in the polymer melt, and to keep the microgels from inordinately increasing in size with increasing degree of crosslinking. An optional devolatilization zone may be used to remove any volatiles, if desired. The resulting crosslinked polymer melt may then be pumped through a die to a pelletizer.

The process of the present invention can be utilized to produce a low cost, safe crosslinked toner resin with substantially no unreacted vinyl monomer or residual byproducts of crosslinking, and which can be sufficiently fixed at low temperature by hot roll fixing to afford energy saving, is particularly suitable for high speed fixing, shows excellent offset resistance and wide fusing latitude, for example, low fix temperature and high offset temperature, and shows minimized or no vinyl offset.

Furthermore, the distance between the base resin chains can be closely controlled by the size of crosslinking segments or spacers which are determined by the choice of the type and concentration of vinyl monomer added to the melt reaction. This enables controlled crosslink density variation which can influence the polymer light scattering properties and can be manifested for example, as gloss or matte finishes in the toner images. Also the ratio of vinyl monomer to reactive resin can be adjusted to help control the glass transition temperature of the final polymer. This provides for the use of a variety of reactive base resins. Thus, a lower $T_g$ base resin composition can be utilized, and with the incorporation of a higher $T_g$ vinyl monomer by crosslinking, the final toner resin has a satisfactory blocking temperature whereas the final toner resin if fabricated from a physical blend of the base polymer without the crosslinking reaction of the present invention and a homopolymer derived from the crosslinking vinyl monomer has toner blocking disadvantages.

DETAILED DESCRIPTION OF PREFERRED EMBODIMENTS

The present invention provides a process for fabricating low fix temperature toner resins by reactive melt mixing in any melt mixing device, batch or continuous, but preferably continuous such as, for example, an extruder wherein polymer base resins are crosslinked at high temperature and under high shear conditions, preferably using a mixture comprised of a free radical initiator compound, an optional unreactive resin or wax diluent, and a vinyl monomer compound as a crosslinking agent. Crosslinked toner resins prepared by a process related to the present invention are disclosed in detail in the aforementioned U.S. Pat. No. 5,227,460 (D/91117Q), the disclosure of which is hereby totally incorporated herein by reference. Use of diluted free radical initiators is disclosed in Copending Application U.S. Ser. No. 08/131,250 (D/92556) filed Oct. 4, 1993, entitled "Melt Mixing Processes" the disclosure of which is hereby totally incorporated herein by reference.

Low fix temperature toner resins are fabricated in embodiments, of the present invention, by a reactive melt mixing process comprising: (a) melting a reactive base resin, thereby forming a polymer melt; (b) adding to said polymer melt a mixture comprised of a free radical initiator compound or free radical initiator compound diluted with an unreactive second resin, and a vinyl monomer compound to form a second melt; and (c) heating and mixing under high shear said second melt to form a crosslinked and partially gelled toner resin.

In a preferred embodiment, the process comprises: forming a mixture by preblending the reactive base resin, and a high temperature half life free radical initiator compound; feeding the mixture to an extruder; gently heating the mixture at a temperature of from about 70° to about 120° C. to melt the base resin and to further disperse the free radical initiator compound therein but without significant free radical degradation or initiation; heating to a temperature of from about 130° to about 200° C. to cause free radical initiator degradation with reaction of the mixture while simultaneously introducing to the melt mixture a vinyl monomer; keeping the resulting polymer melt mixture in the extruder for a sufficient residence time, for example, 10 seconds to about 10 minutes, at a given temperature such that the required amount of interchain spacer type crosslinking is achieved; providing sufficiently high shear during the crosslinking reaction thereby keeping the gel particles formed during crosslinking small in size and well distributed in the polymer melt; optionally devolatilizing the melt to remove any effluent volatiles; and pumping the resulting crosslinked resin melt through a die to a pelletizer and thereafter forming toner particles.

In the process of the present invention, the fabrication of the crosslinked resin may be carried out in a melt mixing device such as an extruder described in U.S. Pat. No. 4,894,308 to Mahabadi et al., the disclosure of which is hereby totally incorporated herein by reference. Generally, any high shear, high temperature melt mixing device suitable for processing polymer melts may be employed, provided that the objectives of the present invention are achieved. Examples of continuous melt mixing devices include single screw extruders or twin screw extruders, continuous internal mixers, gear extruders, disc extruders and roll mill extruders. Examples of batch internal melt mixing devices include Banbury mixers, Brabender mixers, and Haake mixers.

One suitable type of extruder is a fully intermeshing corotating twin screw extruder such as, for example, the ZSK-30 twin screw extruder, available from Werner & Pfleiderer Corporation, Ramsey, N.J., U.S.A., which has a screw diameter of 30.7 millimeters and a length-to-diameter (L/D) ratio of 37.2. The extruder can melt the base resin, mix the free radical initiator compound or resin diluted free radical initiator alone or alternatively with a vinyl monomer crosslinking agent present into the base resin melt, provide high temperatures in the range of 140° to 200° C. and adequate residence time, for example, 10 seconds to about 10 minutes, for the crosslinking reaction to be carried out, control the reaction temperature via appropriate temperature controls along the extruder channel, optionally devolatilize the melt to remove any effluent volatiles if needed, and pump the crosslinked polymer melt product through a die such as a strand die to a pelletizer. For chemical reactions in highly viscous materials, reactive extrusion is particularly efficient, and is advantageous because it requires no solvents, and thus is easily environmentally controlled. It is also advantageous because it permits a high degree of initial mixing of base resin and initiator to take place, and provides an environment wherein a controlled high temperature, which is adjustable along the length of the extruder, is available so that a very quick reaction can occur. It also enables a reaction to take place continuously, and thus the reaction is not limited by the disadvantages of a batch process, wherein the reaction must be repeatedly stopped so that the reaction products may be removed and the apparatus cleaned and prepared for a subsequent reaction. As soon as the desired amount of crosslinking is achieved, the reaction products can be quickly and continuously removed from the reaction chamber.

Figure 1:
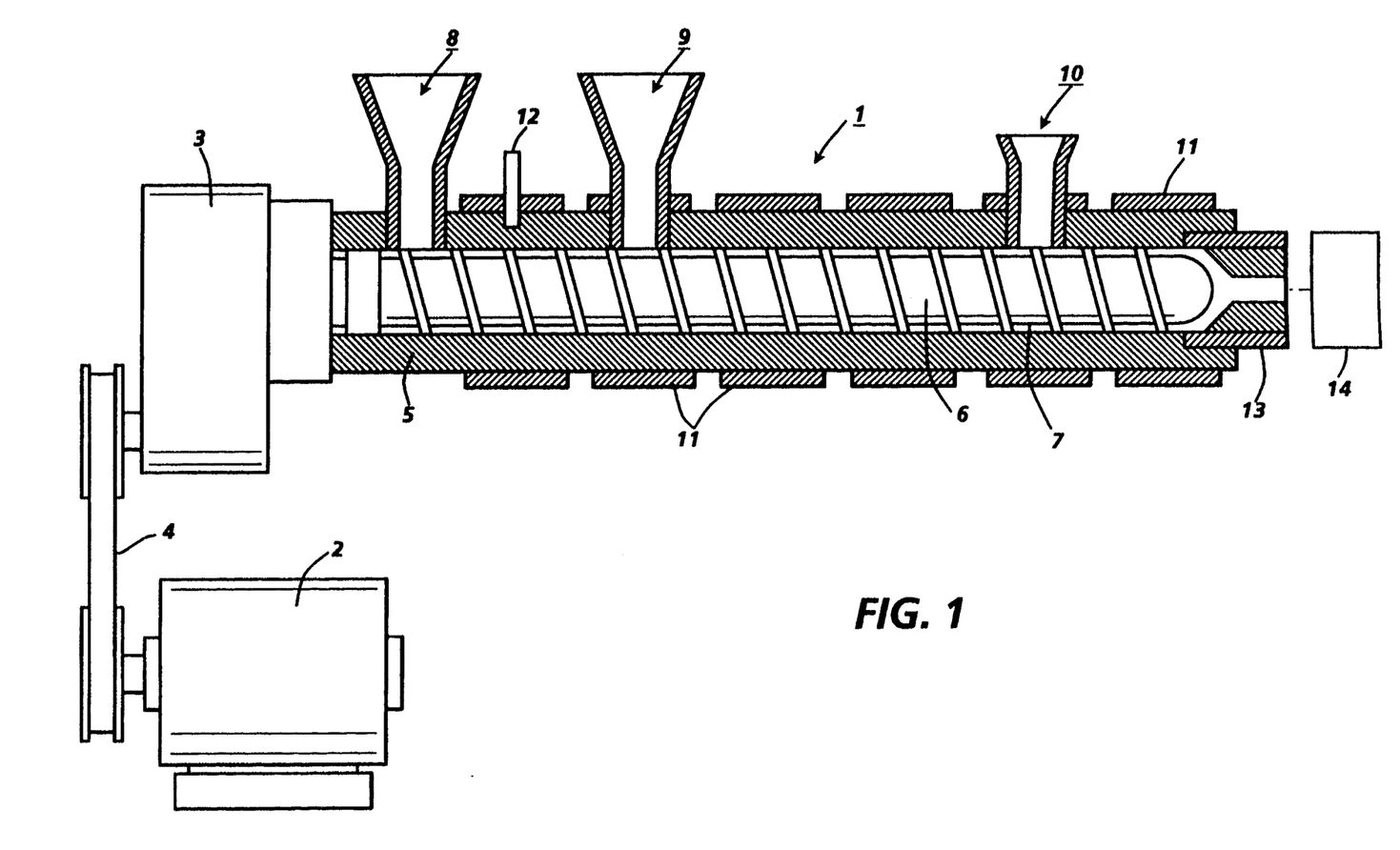
FIG. 1 is a partially schematic cross-sectional view of a reactive extrusion apparatus suitable for the process of the present invention.
Figure 2:
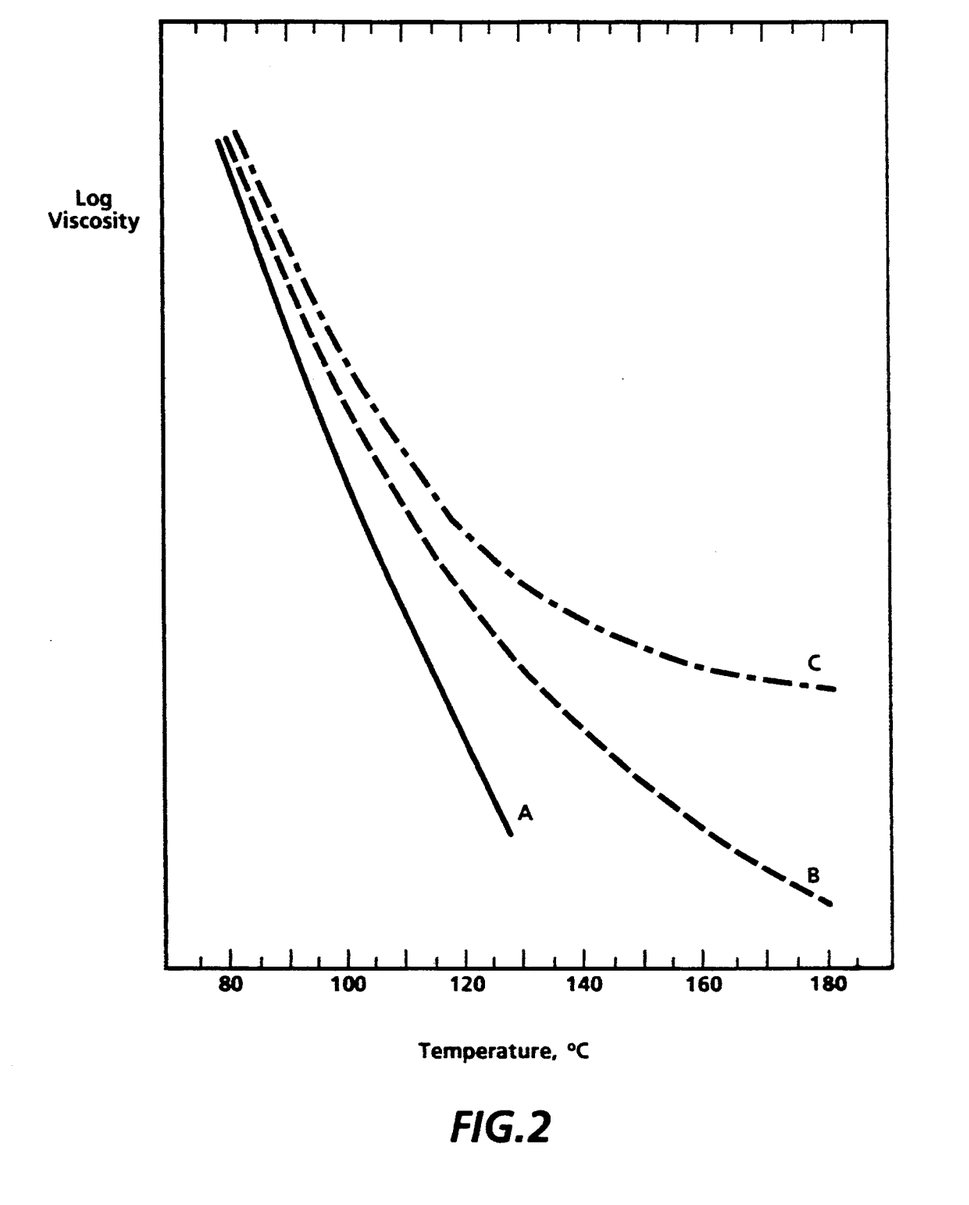
FIG. 2 depicts the effect of temperature on melt viscosity of various toner resins. Viscosity curve A is for a base resin which is a linear (non-crosslinked) unsaturated polyester resin with low fix temperature and very low fusing latitude and is not suitable for hot roll fusing. Viscosity curves B and C are for crosslinked polyester resins prepared by the process of the present invention which resins possess low fix temperatures and good fusing latitudes. The resin of curve C has a higher gel content than that of curve B.

For a better understanding of the present invention, a typical reactive extrusion apparatus suitable for the process of the present invention is illustrated in FIG. 1. FIG. 1 shows a twin screw extrusion device 1 containing a drive motor 2, a gear reducer 3, a drive belt 4, an extruder barrel 5, a screw 6, a screw channel 7, an upstream supply port or hopper 8, a downstream supply port 9, a downstream devolatilizer 10, a heater 11, a thermocouple 12, a die or head pressure generator 13, and a pelletizer 14. The barrel 5 consists of modular barrel sections, each separately heated with heater 11 and temperature controlled by thermocouple 12. With modular barrel sections, it is possible to locate feed ports and devolatilizing ports at required locations, and to provide segregated temperature control along the screw channel 7. The screw 6 is also modular, enabling the screw to be configured with modular screw elements and kneading elements having the appropriate lengths, pitch angles, and the like, in such a way as to provide optimum conveying, mixing, reaction, devolatilizing and pumping conditions.

In operation, the components to be reacted and extruded, for example, the base resin and free radical initiator or mixture of either free radical initiator compound or resin diluted free radical initiator compound and vinyl monomer, enter the extrusion apparatus from the first upstream supply port 8 and/or second downstream supply port 9. The base resin, usually in the form of solid pellets, chips, granules, or other forms can be fed to the first upstream supply port 8 and second downstream supply port 9 by starve feeding, gravity feeding, volumetric feeding, loss-in-weight feeding, or other known feeding methods. Feeding of the free radical initiator to the extruder depends in part on the nature of the free radical initiator. In one embodiment of the invention, especially if the free-radical initiator compound is a solid, the base resin and initiator compound are preblended prior to being added to the extruder, and the preblend, the base resin and/or additional initiator may be added through either upstream supply port 8, downstream supply port 9, or both. In another embodiment, especially if the initiator is a liquid, the reactive base resin and free radical initiator can preferably be added to the extruder separately through upstream supply port 8, downstream supply port 9, or both. This does not preclude other methods of adding the base resin and initiator to the extruder. After the base resin and free-radical initiator have been fed into screw channel 7, the resin is melted and the initiator is dispersed into the molten resin as it is heated, but preferably still at a temperature below what is needed for crosslinking processes to efficiently occur. Heating takes place from two sources: (1) external barrel heating from heaters 11, and (2) internal heating from viscous dissipation within the polymer melt itself. When the temperature of the molten resin, initiator, and vinyl monomer reach a critical point, onset of the crosslinking reaction takes place. It is preferable, although not absolutely necessary, that the time required for completion of the crosslinking reaction not exceed the residence time in the screw channel 7. The rotational speed of the extruder screw preferably ranges from about 50 to about 500 revolutions per minute. If needed, volatiles may be removed through downstream devolatilizer port 10 by, for example, applying a vacuum. At the end of screw channel 7, the crosslinked resin is pumped in molten form through die 13, such as for example a strand die, to pelletizer 14 such as, for example, a water bath pelletizer, underwater granulator, etc.

With further reference to FIG. 1, the rotational speed of the screw 6 can be of any suitable value provided that the objectives of the present invention are achieved. Generally, the rotational speed of screw 6 is from about 50 revolutions per minute to about 500 revolutions per minute. The barrel temperature, which is controlled by thermocouples 12 and generated in part by heaters 11, is from about 40° C. to about 250° C. The temperature range for mixing the base resin and free radical initiator and optionally vinyl monomer in the upstream barrel zones is from about the melting temperature of the base resin to below the crosslinking onset temperature, and preferably within about 40° C. of the melting temperature of the base resin. For example, for an unsaturated polyester base resin the temperature is preferably about 90° C. to about 130° C. The temperature range for the crosslinking reaction in the downstream barrel zones is above the crosslinking onset temperature and the base resin melting temperature, preferably within about 150° C. of the base resin melting temperature. For example, for an unsaturated polyester base resin, the temperature is preferably about 70° C. to about 250° C. The die or head pressure generator 13 generates pressure from about 50 pounds per square inch to about 500 pounds per square inch. In one embodiment, the screw is allowed to rotate at about 100 revolutions per minute, the temperature along barrel 5 is maintained at about 70° C. in the first barrel section and 160° C. further downstream, and the die pressure is about 50 pounds per square inch.

When crosslinking in a batch internal melt mixing device, the residence time is preferably in the range of about 10 seconds to about 5 minutes. The rotational speed of a rotor in the device is preferably about 10 to about 500 revolutions per minute.

Thus, in a process of the present invention, a reactive base resin in admixture with a free radical initiator compound or resin diluted free radical initiator compound, and a vinyl monomer compound, are fed to a reactive melt mixing apparatus and vinyl monomer based crosslinking is carried out at high temperature and high shear to produce a crosslinked resin which enables the preparation of low fix temperature toners with good fusing latitude and vinyl offset properties.

The base resin used in the process of this invention is, for example, a reactive polymer, preferably a linear reactive polymer such as, for example, linear unsaturated polyester. In preferred embodiments, the base resin has a degree of unsaturation of about 0.1 to about 65 mole percent, preferably about 1 to about 50 mole percent. In a preferred embodiment, the linear unsaturated polyester base resin is characterized by number-average molecular weight ($M_n$) as measured by gel permeation chromatography (GPC) in the range typically from 1,000 to about 20,000, and preferably from about 2,000 to about 5,000, weight average molecular weight ($M_w$) in the range typically from 2,000 to about 40,000, and preferably from about 4,000 to about 15,000. The molecular weight distribution ($M_w/M_n$) is in the range typically from about 1.5 to about 6, and preferably from about 2 to about 4. Onset glass transition temperature ($T_g$) as measured by differential scanning calorimetry (DSC) is in the range typically from 50° C. to about 70° C., and preferably from about 51° C. to about 60° C. Melt viscosity as measured with a mechanical viscometer at 10 radians per second is from about 5,000 to about 200,000 poise, and preferably from about 10,000 to about 100,000 poise at 100° C., and drops sharply with increasing temperature to from about 100 to about 5,000 poise, and preferably from about 250 to about 2,000 poise, as temperature rises from 100° C. to 130° C.

Linear unsaturated polyesters used as the base resin are in embodiments of the present invention low molecular weight condensation polymers which may be formed by the step-wise reactions between both saturated and unsaturated diacids, diesters or anhydrides and dihydric alcohols such as glycols or diols. The resulting unsaturated polyesters are reactive, that is crosslinkable, in two respects: (i) unsaturation sites (double bonds) along the polyester backbone chain; and (ii) functional groups such as carboxyl, hydroxy, and the like, groups amenable to acid-base or condensation reactions. Typical unsaturated polyesters useful for this invention are prepared by melt polycondensation or other polymerization processes using diacids, diesters and/or anhydrides and diols. Suitable diacids and anhydrides include but are not limited to saturated diacids and/or anhydrides such as, for example, succinic acid, glutaric acid, adipic acid, pimelic acid, suberic acid, azelaic acid, sebacic acid, isophthalic acid, terephthalic acid, hexachloroendomethylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like, diesters derived therefrom and mixtures thereof; and unsaturated diacids and/or anhydrides such as, for example, maleic acid, fumaric acid, chloromaleic acid, itaconic acid, citraconic acid, mesaconic acid, maleic anhydride, diesters thereof, and the like, and mixtures thereof. Suitable diols include, but are not limited to, for example, propylene glycol, ethylene glycol, diethylene glycol, neopentyl glycol, dipropylene glycol, dibromoneopentyl glycol, propoxylated bisphenol-A, ethoxylated bisphenol-A, 2,2,4-trimethylpentane-1,3-diol, tetrabromo bisphenol dipropoxy ether, 1,4-butanediol, 1,3 butanediol, and the like, and mixtures thereof, soluble in highly dissolving solvents such as, for example, tetrahydrofuran, toluene, and the like.

Preferred linear unsaturated polyester base resins are prepared from diacids, diesters and/or anhydrides such as, for example maleic anhydride, fumaric acid, and the like and mixtures thereof, and diols such as, for example, propoxylated bisphenol-A, propylene glycol,1,3 butanediol, and the like, and mixtures thereof. A particularly preferred polyester is poly(propoxylated bisphenol A fumarate).

Substantially any suitable unsaturated polyester can be used in the process of the invention, including unsaturated polyesters known for use in toner resins and including unsaturated polyesters whose properties previously made them undesirable or unsuitable for use as toner resins but which adverse properties are eliminated or reduced by crosslinking the unsaturated polyesters by processes of the present invention.

Any appropriate initiation technique for crosslinking can be used in the process of the invention. Free radical initiators such as, for example, organic peroxides or azo compounds are preferred for this process. Suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, o,o-t-butyl o-isopropyl monoperoxy carbonate, 2,5-dimethyl 2,5di(benzoyl peroxy)hexane, o,o-t-butyl o-(2-ethyl hexyl)monoperoxy carbonate, and o,o-t-amyl o-(2-ethyl hexyl)monoperoxy carbonate, alkyl peroxides such as, for example, dicumyl peroxide, 2,5-dimethyl 2,5-di(t-butylperoxy)hexane, t-butyl cumyl peroxide, α-α-bis(t-butyl peroxy)diisopropyl benzene, di-t-butyl peroxide and 2,5-dimethyl 2,5-di(t-butyl peroxy)hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di(t-butyl peroxy)valerate, 1,1-di(t-butyl peroxy)3,3,5-trimethyl cyclohexane, 1,1-di(t-butyl peroxy)cyclohexane, 1,1-di(t-amyl peroxy)cyclohexane, 2,2-di (t-butyl peroxy) butane, ethyl 3,3-di (t-butyl peroxy)butyrate and ethyl 3,3-di(t-amyl peroxy)butyrate. Suitable azo compounds include 2,2'-azobis-(isobutyronitrile), 2,2'-azobis(2,4-dimethyl valeronitrile), 2,2'-azobis(methyl butyronitrile), 1,1'-azobis(cyano cyclohexane) and other similar known compounds.

The resin diluted free radical initiator compound can be any of the above radical initiators diluted in unreactive matrix resin. For example, useful diluent resins include these resins or waxes without olefinic double bonds, carboxylic acids or hydroxyl groups, other functional groups which are not readily abstracted in free radical reactions under the conditions of the present process, and are selected from the group consisting of methyl terpolymer, a polyvinylidine fluoride, a polymethyl methacrylate, hydrogenated poly(styrene-butadiene), polyisobutylmethacrylate, polyacrylate, polymethacrylate, polystyrene, polystyrene acrylate, polystyrene methacrylate, polyvinyl chloride, a wax component with a weight average molecular weight from about 1,000 to about 6,000, and mixtures thereof.

The vinyl monomer compounds useful in the present invention can be any vinyl monomer or mixture of monomers that are readily polymerizable by free radical species thereby functioning as a crosslinking "spacer" agent, and which monomers are selected from the group consisting of styrene and derivatives thereof, conjugated dienes and derivatives thereof, acrylates and derivatives thereof, and mixtures thereof.

In embodiments of the present invention, the fraction of the free radical initiator compound to the base resin can be from about 0.01 to about 10 percent. The weight fraction of a mixture of free radical initiator compound and vinyl monomer to the base resin can be from about 2 to about 50 percent. The weight fraction of vinyl monomer to the base resin can be from about 1.0 to about 40 percent. The weight fraction of the optional diluent resin or wax to the free radical initiator can be from about 20 to about 300 percent. The vinyl monomer to free radical initiator mole ratio can be from about 1:1 to about 10,000:1.

Preferably, the rate of reaction of free radical species generated on the backbone of the polymer chain by the free radical initiator, with the vinyl monomer crosslinking agent, is more rapid than a competing direct interchain coupling reaction. The following discussion of reactivity ratios illustrates the importance of the relative ratio of reaction. It is known that the reactivity ratios for vinyl polymerization favors the heteromonomer reaction of styrene to fumarate and fumarate to styrene rather than the homomonomer reaction of fumarate to fumarate, as disclosed in "UNSATURATED POLYESTERS:STRUCTURE AND PROPERTIES", by Herman V. Boenig, p. 17, Elsevier Publishing Co., New York, (1964). The letters $r_1$ and $r_2$, respectively, represent relative monomer reactivity ratios defined by the equations:

$$r_1 = \frac{k_{11}}{k_{12}} = \frac{\text{Styrene-Styrene}}{\text{Styrene-Fumarate}} = 0.21 \text{ to } 0.30$$

$$r_2 = \frac{k_{22}}{k_{21}} = \frac{\text{Fumarate-Fumarate}}{\text{Fumarate-Styrene}} = 0.02 \text{ to } 0.07$$

wherein a growing chain, ending in $m_1$, the addition of $M_1$ represents $k_{11}$, wherein a growing chain, ending in $m_1$, the addition of $M_2$ represents $k_{12}$, wherein a growing chain, ending in $m_2$, the addition of $M_2$ represents $k_{22}$, and wherein a growing chain, ending in $m_2$, the addition of $M_1$ represents $k_{21}$. The reactivity therefore of adding either styrene radicals to fumarate double bonds, or fumarate radicals to styrene double bonds is a highly favored and a predominant reaction pathway and occurs in preference to the formation of homopolymers of fumarate or homopolymers of styrene. Although not wanting to be limited by theory, it is believed that the foregoing discussion of reactivity ratios is applicable to preferred monomer reactions and products formed thereby in embodiments of the present invention.

In the crosslinking reaction which occurs in processes of the present invention at high temperature and high shear, the free radical initiator, such as for example benzoyl peroxide, disassociates to form free radicals which preferentially attack the linear unsaturated base resin polymer chains, for example, at double bonds, to form polymeric radicals or radical sites on the polymer chain backbone. Crosslinking occurs as these polymeric radical sites react with vinyl monomer or monomers in close proximity thereto to a limited extent in preference to other unsaturated chains or other polymeric radicals, and thereafter the resulting chain pendant styryl radicals or oligomeric styryl radicals react preferentially intermolecularly with unsaturated bonds or equivalent available radical chain species in the reactive base resin forming high molecular weight gel particles with controlled crosslinking density. In the crosslinking reaction which occurs in the process of the present invention at high temperature and high shear, and in the presence of monomers, the chemical initiator, for example benzoyl peroxide, disassociates to form free radicals (step I) which attack the linear unsaturated base resin polymer chains, for example, at double bonds to form polymeric radicals (step II) which in turn readily reacts with one or more molecules of vinyl monomer, for example, styrene to form monomer or oligomeric grafted vinyl monomer chain radical species. Crosslinking of the present invention is believed to occur as these oligomeric graft radicals further react with other unsaturated predominantly through the sequence shown in the aforementioned steps I through III. The

III chains or other monomer or polymeric radicals (step III), forming high molecular weight but loosely crosslinked gel particles, that is the polymeric chains are not in close proximity to one another since one or more vinyl monomers provide "spacer" units which lowers the crosslink density compared to a directly crosslinked sample prepared in the absence of the vinyl monomer oligomer crosslink spacer.

single headed arrow or "fishhook" represents free radical species attack on an olefin or another free radical resulting in covalent bond formation. Alternatively, the free radical species can abstract an atom, but this is a less preferred pathway in view of the aforementioned reactivity ratios.

For example, an exemplary propoxylated bisphenol A fumarate unsaturated polymer undergoes the first continued reaction with
monomer or unsaturated polymer The crosslinking which occurs in the process of the invention is terized by at least one reactive site, that is one unsaturation or double bond, within a polymer chain reacting substantially directly, with one or more vinyl monomer(s), to form a grafted monomer or oligomeric units. The final step in the crosslinking reaction sequence may occur by a number of mechanisms. Without intending to be limited by theory, it is believed that the crosslinking process of the present invention occurs step (step I) in the crosslinking sequence with a free radical initiator, for example, benzoyl peroxide obtained in a pelletized form, thereby producing a free radical on the polymer resin chain backbone which in turn preferentially attacks a vinyl monomer in the immediate vicinity and in turn produces monomeric or oligomeric vinyl graft radical species. As the vinyl monomer is consumed the oligomeric graft species begin to preferentially react intermolecularly with other unsaturated sites on another base polymer resin by further radical addition reactions or by hydrogen abstraction reactions as shown in the accompanying scheme below, and which chain abstraction product can further react with other free radical species and contribute to termination of the crosslinking process and additional intermolecular crosslinking.

This manner of crosslinking between chains will produce a high molecular weight intermolecularly bonded network of polyester resin molecules that are connected yet separated by vinyl monomer spacer linkages, ultimately forming an open gel, wherein $m_1$ (or $m_2$ not shown), and n represent the number of segments of the polymer resin that participate in the hydrogen abstraction/termination process. In preferred embodiments of the exemplary polyester, $m_1$ and $m_2$ are at least 1 and the sum of $m_1$ and $m_2$ is not greater than 3. Specifically, $m_1$ and $m_2$ are independently from 1 to 3, and n is from about 8 to 11.

A small concentration of free radical initiator is adequate in embodiments to accomplish the intermolecular spacing and crosslinking process of the present invention, usually in the range of from about 0.01 to about 10, and preferably about 10 percent by weight of initiator in the crosslinkable reactive base resin, and preferably in the range of from about 0.1 to about 4 percent by weight of initiator in the crosslinkable resin. By effecting the crosslinking in the melt state at high temperature and high shear in a melt mixing device, such as an extruder, the gel particles formed during crosslinking are kept small, that is submicron, for example, less than about 0.2 micron primary particle diameters as determined by light scattering, and the size of the particle does not grow or very minimal growth is achieved with increasing degree of crosslinking. Also, the high shear enables the microgel particles to be substantially uniformly dispersed in the polymer melt.

An advantage of using a free radical initiator as the crosslinking initiator is that by utilizing low concentrations of initiator, for example, less than about 10 percent by weight and in embodiments preferably less than about 4 percent by weight, and carrying out the crosslinking at high temperature, little or no unreacted initiator remains in the product, and therefore, the residual contaminants produced in the crosslinking reaction are minimized.

Thus, the crosslinked resin produced in processes of the present invention is a clean and safe polymer mixture comprising reacted vinyl monomer crosslinked gel particles and a non-crosslinked or linear portion but substantially no sol. The gel content of the crosslinked resin ranges from about 0.001 to about 50 percent by weight, and preferably from about 0.1 to about 40 percent by weight, and more preferably from about 3 to about 10 percent by weight for colored toners and from about 20 to about 40 percent by weight for black toners, wherein the gel content is defined as follows:

$$\% \text{ Gel Content} = \frac{\text{Total Sample Weight} - \text{Weight of Soluble Polymer}}{\text{Total Sample Weight}} \times 100$$

There is substantially no crosslinked polymer which is not gel, that is, low crosslink density polymer or sol, as would be obtained in conventional crosslinking processes such as, for example, polycondensation, bulk, solution, suspension, emulsion and suspension polymerization processes.

The crosslinked portions of the crosslinked resin product consist essentially of very high molecular weight microgel particles with high density crosslinking and interpolymeric chain separation from vinyl monomer grafting and crosslinking reactions as measured by gel content and which particles are not soluble in substantially any solvents such as, for example, tetrahydrofuran, toluene, and the like. The microgel particles are highly crosslinked polymers with a short crosslink interpolymeric separation distance of about one to ten vinyl monomers.

The linear portions of the crosslinked resin have substantially the same number average molecular weight ($M_n$), weight average molecular weight ($M_w$), molecular weight distribution ($M_w/M_n$), onset glass transition temperature ($T_g$) and melt viscosity as the base resin. Thus in embodiments, the entire crosslinked resin product has an onset glass transition temperature of from about 50° C. to about 70° C., and preferably from about 51° C. to about 60° C., and a melt viscosity of from about 5,000 to about 200,000 poise, and preferably from about 20,000 to about 100,000 poise, at 100° C. and from about 10 to about 20,000 poise at 160° C.

In the preferred embodiment of a crosslinked unsaturated polyester resin prepared by processes of this invention, the crosslinked resin enables the preparation of toners with minimum fix temperatures in the range of about 100° C. to about 200° C., preferably about 100° C. to about 160° C., more preferably about 110° to about 150° C. Also, these low fix temperature toners have fusing latitudes ranging from about 10° C. to about 120° C. and preferably more than about 20° C., and more preferably, more than about 30° C. Processes of the invention can produce toner resins and thus toners with minimized or substantially no vinyl offset.

Figure 3:
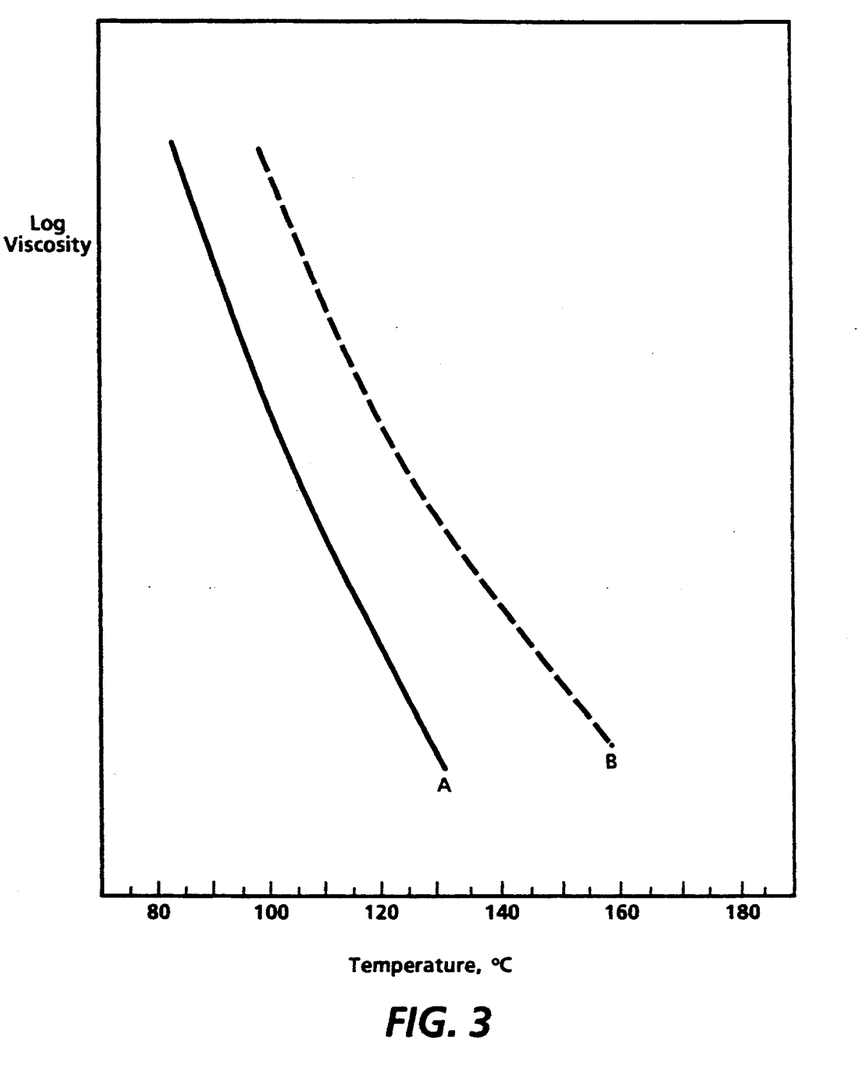
FIG. 3 depicts the effect of crosslinking on the melt viscosity of resins prepared by a conventional crosslinking approach. Viscosity curve A is for a linear (non-crosslinked) unsaturated polyester resin with low fix temperature and very low fusing latitude. Viscosity curve B is for an unsaturated polyester resin crosslinked by conventional methods which does not employ interchain spacer units, which resin has a good fusing latitude, but also has a high fixing temperature.
Figure 4:
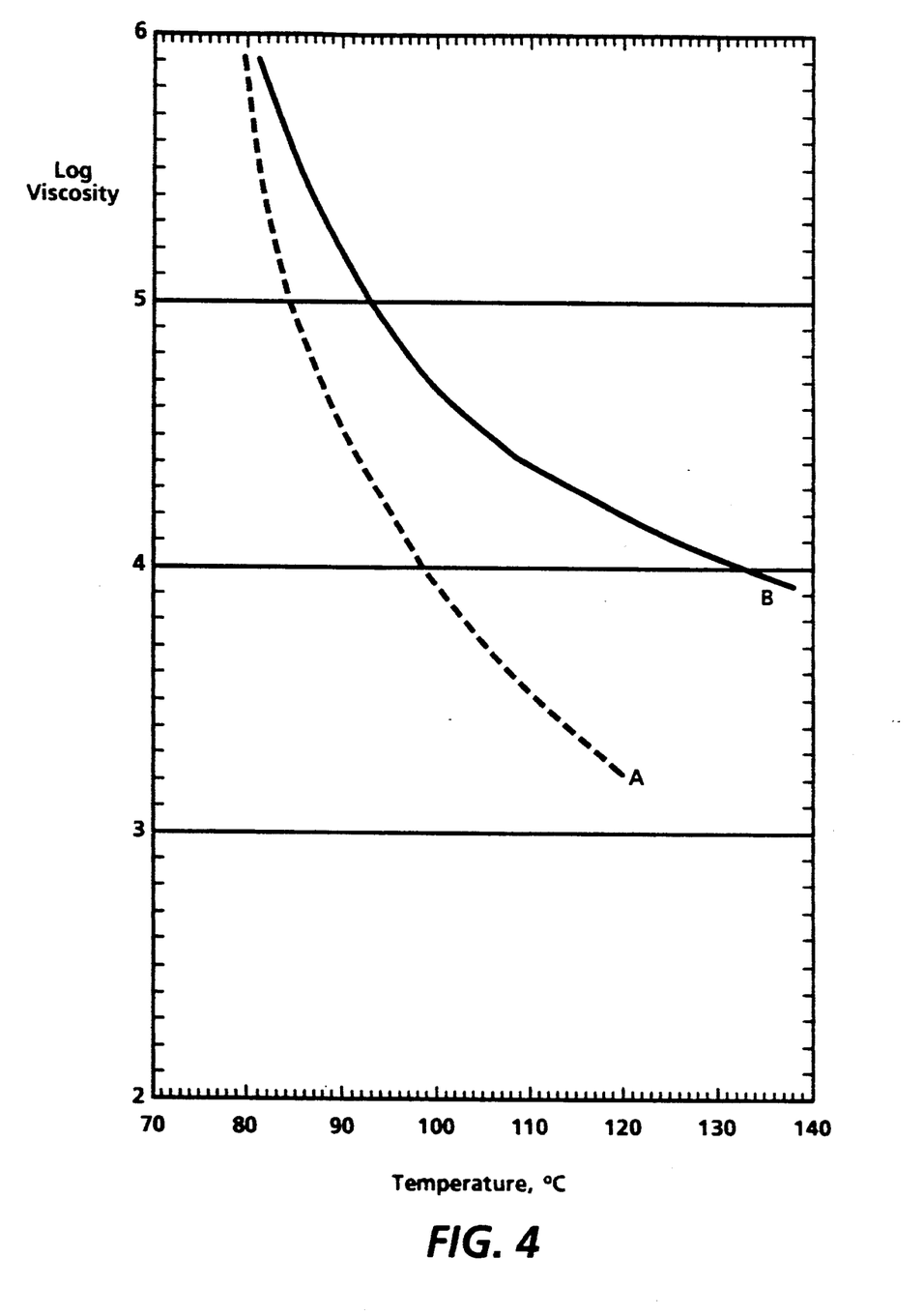
FIG. 4 shows the effect of crosslinking on the melt viscosity of toners based on crosslinked polyester resins of the present invention. Curve A is a control and shows the melt viscosity of an un-crosslinked polyester toner resin formulated with carbon black. Curve B shows the same resin formulated with carbon black as in A, which resin was crosslinked with a mixture of styrene and butyl acrylate and 1.2 weight percent benzoyl peroxide according to the present invention.

Crosslinked polymers so produced have the important rheological property of allowing a toner prepared therefrom to show low fix temperature and high offset temperature. The low fix temperature is a function of the molecular weight and the molecular weight distribution of the linear portion, and is believed not to be significantly affected by the amount of microgel or degree of crosslinking in the resin. This is demonstrated by the close proximity of both viscosity curves A and B at low temperature, for example at about 80° C. as shown in FIG. 4 for un-crosslinked and crosslinked unsaturated polyester. The hot offset temperature is increased by the presence of microgel particles which impart elasticity to the resin. Thus, with a higher degree of crosslinking or gel content, the hot offset temperature increases. This is reflected in divergence of the viscosity curves at higher temperature, for example, at 120° C. as also shown in FIG. 4. As the degree of crosslinking or gel content increases, the low temperature melt viscosity does not change significantly while the high temperature melt viscosity increases considerably. In an exemplary embodiment, the hot offset temperature can increase approximately 30% relative to the unmodified resin. This is achieved by crosslinking in the melt state at high temperature and high shear, for example, in an extruder resulting in the formation of microgel alone, distributed substantially uniformly throughout the linear portion, and no intermediates which are crosslinked polymers with low crosslinking density (sol). When crosslinked intermediate polymers are generated by conventional polymerization processes, the viscosity curves shift to the right in parallel from a low to high degree of crosslinking as shown in FIG. 3. This is reflected in increased hot offset temperature, but may also indicate an increase in minimum fix temperature.

In addition to providing a unique rheological property to the toner resin not attainable by conventional crosslinking processes for preparing toner resins, the reactive melt mixing processes of the present invention have several other important advantages. By choosing the type and molecular weight properties of the base resin, the minimum fix temperature can be easily manipulated. The hot offset temperature can also be easily manipulated by controlling the gel content in the crosslinked resin which can be regulated by the amount of free radical initiator, and vinyl monomer fed to the extruder and/or regulating the extruder process conditions such as, for example, feed rate, screw rotational speed, barrel temperature profile, screw configuration, and length. Thus, it is possible to produce a series of resins and thus toners with the same MFT, but with different fusing latitudes. Crosslinking by the use of free radical initiators in the extruder is a very clean means of modifying resin, since very low concentrations of initiators are used, often less than 4 percent by weight, and the residual contaminants of the crosslinking reaction are minimal.

The resins are generally present in the toner in an amount of from about 40 to about 98 percent by weight, and more preferably from about 70 to about 98 percent by weight, although they may be present in greater or lesser amounts, provided that the objectives of the invention are achieved. For example, toner resin produced by processes of the present invention can be subsequently melt blended or otherwise mixed with a colorant, charge carrier additives, surfactants, emulsifiers, pigment dispersants, flow additives, and the like. The resultant product can then be pulverized by known methods such as milling to form toner particles. The toner particles preferably have an average volume particle diameter of about 5 to about 25, more preferably about 5 to about 15 microns.

Various suitable colorants can be employed in toners of the invention, including suitable colored pigments, dyes, and mixtures thereof including carbon black, such as Regal 330 ® carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast blue, Cinquassi Green, Hostaperm Green, titanium dioxide, cobalt, nickel, iron powder, Sicopur 4068 FF, and iron oxides such as Mapico Black (Columbia), NP608 and NP604 (Northern Pigment), Bayferrox 8610 (Bayer), MO8699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner and about 5 to about 60 percent by weight for black toner.

Various known suitable effective positive or negative charge enhancing additives can be selected for incorporation into the toner compositions produced by the present invention, preferably in an amount of about 0.1 to about 10, more preferably about 1 to about 3, percent by weight. Examples include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum salts such as Bontron E84 TM or E88 TM (Hodogaya Chemical); and the like.

Additionally, other internal and/or external additives may be added in known amounts for their known functions.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles which are positively charged will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the entire disclosure of which is hereby totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are hereby totally incorporated hereby by reference.

The selected carrier particles can be used with or without a coating, the coating generally being comprised of fluoropolymers, such as polyvinylidene fluoride resins, terpolymers of styrene, methyl methacrylate, a silane, such as triethoxy silane, tetrafluoroethylenes, other known coatings and the like.

The diameter of the carrier particles is generally from about 50 microns to about 1,000 microns, preferably about 200 microns, thus allowing these particles to possess sufficient density and inertia to avoid adherence to the electrostatic images during the development process. The carrier particles can be mixed with the toner particles in various suitable combinations. Best results are obtained when about 1 part toner to about 10 parts to about 200 parts by weight of carrier are mixed.

Toners produced by the process of the invention can be used in known electrostatographic imaging methods, although the fusing energy requirements of some of those methods can be reduced in view of the advantageous fusing properties of the subject toners as discussed herein. Thus, for example the toners or developers can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll at a temperature lower than 200° C., preferably lower than 150° C.

The invention will further be illustrated in the following, nonlimiting examples, it being understood that these examples are intended to be illustrative only and that the invention is not intended to be limited to the materials, conditions, process parameters and the like recited herein. Parts and percentages are by weight unless otherwise indicated.

EXAMPLE I

A crosslinked unsaturated polyester resin is prepared by the reactive extrusion process by melt mixing 94.3 parts of a linear unsaturated polyester with the following structure:

wherein n is the number of repeating units and having $M_n$ of about 4,000, $M_w$ of about 10,300, $M_w/M_n$ of about 2.58 as measured by GPC, onset $T_g$ of about 55° C. as measured by DSC, and melt viscosity of about 29,000 poise at 100° C. and about 750 poise at 130° C. as measured at 10 radians per second, 5.0 parts styrene monomer and 0.7 parts benzoyl peroxide initiator as outlined in the following procedure.

The unsaturated polyester resin and benzoyl peroxide initiator are blended in a rotary tumble blender for 30 minutes. The resulting dry mixture is then fed into a Werner & Pfleiderer ZSK-30 twin screw extruder, with a screw diameter of 30.7 mm and a length-to-diameter (L/D) ratio of 37.2, at 10 pounds per hour using a loss-in-weight feeder. The styrene monomer is continuously added via the downstream addition port in an equivalent ratio relative to the fed mixture of resin and peroxide, that is 95:5 parts of feed to styrene monomer. The crosslinking is carried out in the extruder using the following process conditions: barrel temperature profile of 70/140/140/140/140/140/140° C., die head temperature of 140° C., screw speed of 100 revolutions per minute and average residence time of about three minutes. The extrudate melt, upon exiting from the strand die, is cooled in a water bath and pelletized. The product which is a crosslinked polyester has an expected onset $T_g$ of about 54° C. as measured by DSC, melt viscosity of about 40,000 poise at 100° C. and about 400 poise at 160° C. as measured at 10 radians per second, a gel content of about 7.0 weight percent and a primary microgel particle size of about 0.1 micron as determined light scattering.

The linear and crosslinked portions of the product are separated by dissolving the product in tetrahydrofuran and filtering off the microgel. The dissolved part is reclaimed by evaporating the tetrahydrofuran. This linear part of the resin, when characterized by GPC, is expected to have $M_n$ of about 3,900, $M_w$ of about 10,100, $M_w/M_n$ of about 2.59, and onset $T_g$ of about 54° C. which is substantially the same as the original non-crosslinked resin, which indicates that it contains no sol.

Thereafter, a toner is formulated by melt mixing the above prepared crosslinked unsaturated polyester resin, 92 percent by weight, with 6 percent by weight carbon black and 2 percent by weight alkyl pyridinium halide charge enhancing additive in a Haake batch mixer. The toner is pulverized and classified to form a toner with an average particle diameter of about 9.1 microns and a geometric size distribution (GSD) of about 1.32. The toner is evaluated for fixing, blocking, and vinyl offset performance. The cold offset temperature is about 110° C., the minimum fix temperature is about 126° C., the hot offset temperature is about 135° C., and the fusing latitude is about 9° C. Also, the toner has excellent blocking performance, with a $T_g$ of about 53° C. as measured by DSC, and shows no apparent vinyl offset.

EXAMPLE II

A crosslinked unsaturated polyester resin is prepared by the reactive extrusion process by melt mixing 91.8 parts of a linear unsaturated polyester with the structure and properties described in Example I, 5.0 parts styrene monomer and 2.8 parts diluent resin polyalpha-methylstyrene (2,000 molecular weight $T_g=51°$ C.), and 1.4 parts benzoyl peroxide initiator as outlined in the following procedure.

The unsaturated polyester resin and preblended resin diluted benzoyl peroxide initiator are blended in a rotary tumble blender for 30 minutes. The resulting dry mixture is then fed into a Werner & Pfleiderer ZSK-30 twin screw extruder at 10 pounds per hour using a loss-in-weight feeder. The crosslinking is carried out in the extruder using the following process conditions: barrel temperature profile of 70/160/160/160/160/160/160° C., die head temperature of 160° C., screw rotational speed of 100 revolutions per minute and average residence time of about three minutes. The styrene is added as described in Example I. The extrudate melt, upon exiting from the strand die, is cooled in a water bath and pelletized. The product which is a crosslinked polyester has an expected onset $T_g$ of about 54° C. as measured by DSC, melt viscosity of about 65,000 poise at 100° C. and about 12,000 poise at 160° C. as measured at 10 radians per second, a gel content of about 50 weight percent, and a primary microgel particle size of about 0.1 micron as determined by light scattering.

The linear and crosslinked portions of the product are separated by dissolving the product in tetrahydrofuran and filtering off the microgel. The dissolved part is reclaimed by evaporating the tetrahydrofuran. This linear part of the resin, when characterized by GPC, is found to have $M_n$ of about 3,900, $M_w$ of about 10,100, $M_w/M_n$ of about 2.59, and onset $T_g$ of 54° C. which is substantially the same as the original non-crosslinked resin, which indicates that it contains no sol.

Thereafter, a toner is prepared and evaluated according to the same procedure as in Example I except that the average particle diameter is about 9.8 microns and the GSD is about 1.33. The cold offset temperature is about 110° C., the minimum fix temperature is about 135° C., the hot offset temperature is about 195° C., and the fusing latitude is about 60° C. Also, the toner has excellent blocking performance ($T_g$ about 53° C. as measured by DSC) and shows no apparent vinyl offset.

Comparative Example I

This comparative example shows the effect of changes in gel content on toner fixing performance for crosslinked unsaturated polyester resins. Two resins are compared in this example. Resin A is linear unsaturated polyester with the structure and properties of the linear unsaturated polyester used as the base resin as described in Example I. Resin B is styrene crosslinked polyester resin prepared by the reactive extrusion process by melt mixing 94.0 parts linear unsaturated polyester (Resin A), 5.0 parts styrene and 1.0 part benzoyl peroxide initiator as outlined in the following procedure.

The unsaturated polyester resin (Resin A), styrene, and benzoyl peroxide initiator are blended in a rotary tumble blender for 30 minutes. The resulting dry mixture is then fed into a Werner & Pfleiderer ZSK-30 twin screw extruder at 10 pounds per hour using a loss-in-weight feeder. The crosslinking is carried out in the extruder using the following process conditions: barrel temperature profile of 70/160/160/160/160/160/160° C., die head temperature of 160° C., screw rotational speed of 100 revolutions per minute and average residence time of about three minutes. The extrudate melt, upon exiting from the strand die, is cooled in a water bath and pelletized.

Thereafter, Toners A and B are prepared from the resins A and B, respectively, and evaluated according to the same procedure as in Example I. The toner of resin A has an average particle diameter of about 9.3 microns and a GSD of about 1.29. The toner of resin B has an average particle diameter of about 10.1 microns and a GSD of about 1.32. Results of fixing tests are shown in Table 1. Results for Toner A produced from Resin A show a cold offset temperature of about 110° C. and a hot offset temperature of about 120° C. Due to the proximity of COT and HOT, it is not possible to accurately determine the minimum fix temperature, indicating that the fusing latitude is very small. From Table 2, it is seen that with a vinyl monomer crosslinked toner resin of the present invention, the fusing latitude is elevated considerably, while the minimum fix temperature remains virtually unchanged.

ventional crosslinking without vinyl monomer method versus the vinyl monomer crosslinked resin prepared according to the present invention. Two additional resins (C and D shown in FIG. 3 as curves A and B, respectively) are considered in this example, a linear polyester and a crosslinked polyester prepared by conventional crosslinking.

First, a linear polyester resin, Resin C, is prepared by the following procedure. About 1,645 grams of dimethyl terephthalate, 483 grams of 1,2-propane diol, and 572 grams of 1,3-butane diol are charged to a three liter, four necked resin kettle which is fitted with a thermometer, a stainless steel stirrer, a glass inlet tube and a flux condenser. The flask is supported in an electric heating mantle. Argon gas is allowed to flow through the glass inlet tube thereby sparging the reaction mixture and providing an inert atmosphere in the reaction vessel. The stirrer and heating mantle are activated and the reaction mixture is heated to about 80° C. at which time about 0.96 grams of tetraisopropyl titanate is added to the reaction mixture. The reaction mixture is gradually heated to a temperature of about 170° C. whereupon methanol from the condensation reaction is condensed and is removed as it is formed. As the reaction progresses and more methanol is removed, the reaction temperature is slowly increased to about 200° C. Over this period, about 94 weight percent of the theoretical methanol is removed. At this time, the reactor is cooled to room temperature and the reactor is modified by replacing the reflux condenser with a dry ice-acetone cooled trap with the outlet of the trap connected to a laboratory vacuum pump through an appropriate vacuum system. Heat is reapplied to the reactor with the reactants under argon purge. As the reactants become molten, stirring is started. When the reactants are heated to about 84° C. the vacuum is about 30 microns mercury. The reaction is continued at about these conditions for about seven hours until the mixture become so viscous that considerable difficulty is encountered in removing the entrapped volatile reaction by-products from the mixture. At this point, the vacuum is terminated by an argon purge and the reaction product is cooled to room temperature. The resulting polymer is found to have a hydroxyl number of about 48, an acid number of about 0.7, a methyl ester number of about 7.5 and a glass transition temperature of about 56° C. Using vapor pressure osmometry in methyl ethyl ketone, the number average molecular weight of the resulting linear polymer is found to be about 4,100.

Second, a crosslinked polyester resin, Resin D, is prepared by polyesterification by the following procedure. About 1,645 grams of dimethyl terephthalate, 483 grams of 1,2-propane diol, 572 grams of 1,3-butane diol and 15 grams of pentaerythritol as condensation polymerization branching agent are charged to a three liter, four necked resin kettle and the polyesterification and branching are carried out under the same conditions as

TABLE 1

| | Linear Content Wt. % | Sol Content Wt. % | Gel Content Wt. % | COT °C. | MFT °C. | HOT °C. | FL °C. |
|---|---|---|---|---|---|---|---|
| Toner A | 100 | 0 | 0 | 110 | — | 120 | — |
| Toner B | 85 | 0 | 15 | 110 | 129 | 155 | 26 |

Comparative Example II

This comparative example shows the difference between crosslinked polyester resins prepared by a conventional above. The resulting polymer is found to have a hydroxyl number of about 48, an acid number of about 0.7, a methyl ester number of about 7.5 and a glass transition temperature of about 56° C. By dissolution in chloroform and filtration through a 0.22 micron MF Millipore filter under air pressure, the polymer is found to contain about 16 weight percent gel. Using vapor pressure osmometry in methyl ethyl ketone, the number average molecular weight of the soluble fraction of the polymer is found to be about 6,100 which is comprised of linear polymer with a number average molecular weight of about 4,200 and sol.

Thereafter, Toners C and D are prepared from the two resins, C and D, respectively, and evaluated according to the same procedure as in Example I. Results of fixing tests are shown in Table 2 along with the results for a toner of Resin B. The toner particles of Resin C have an average particle diameter of about 8.7 microns and a GSD of about 1.30, while those of Resin D have an average particle diameter of about 10.5 microns and a GSD of about 1.31. The hot offset temperature increases (32° C.) with increasing degree of branching (sol and gel content is 30%). However, this is also accompanied by an increase in minimum fix temperature resulting in only a small increase in fusing latitude (10° C.). Most of the benefit achieved by crosslinking is lost due to the increase in minimum fix temperature. Also in Table 3 are the results of fusing evaluations for Toner B, a styrene monomer crosslinked unsaturated polyester resin of the present invention (see Comparative Example I for details). With Toner B, the fusing latitude increases dramatically with increasing gel content and without increasing sol content, while the minimum fix temperature remains virtually unchanged.

TABLE 2

|  | Linear Content Wt. % | Sol Content Wt. % | Gel Content Wt. % | COT °C. | MFT °C. | HOT °C. | FL °C. |
|---|---|---|---|---|---|---|---|
| Toner B | 85 | 0 | 15 | 110 | 129 | 155 | 26 |
| Toner C | 100 | 0 | 0 | 110 | — | 120 | — |
| Toner D | 70 | 14 | 16 | 120 | 146 | 156 | 10 |

EXAMPLE III

Polyester Base Resin Preparation

An unsaturated polyester base resin was prepared by a conventional polycondensation reaction which was carried out in a three liter, four necked resin kettle fitted with a thermometer, a stainless steel stirrer, a glass inlet tube and a reflux condenser. The flask is supported and heated in an electric mantle. The ingredients were added with a liquid diol introduced first, followed by a solid ester and an anhydride. The ingredients were 20 moles of 1,3 butanediol, 9.37 moles of dimethyl terephthalate, and 0.625 moles of maleic anhydride. It is known that the maleate easily isomerizes to the fumarate form under the conditions typical for a polycondensation reaction so the product of this reaction is referred to as a fumarate. The mixture was heated slowly until most of the ingredients were melted and then slow stirring was begun. The temperature was held at 145° C. with an argon sparge for 30 minutes. At that time 0.016 moles of isopropyl titanate catalyst was added. The argon was continuously bubbled through the stirred mixture and the stirring speed was increased while methanol and water were collected. The temperature was raised slowly to about 200° C. with stirring until about 95% of the theoretical methanol and water were collected. The mixture was cooled, stirring was stopped and the glassware was changed to glassware suitable for application of a vacuum. The mixture was again heated, and stirring slowly increased while a vacuum was applied. The 1,3-butanediol was removed and collected in cold traps as the condensation polymerization continued and the polymer chain lengths increased in size. The reaction was carried out at 200° C. with average pressure of about 100 microns of vacuum. Samples of polymer were periodically withdrawn to determine the extent of the reaction by measurement of the melt flow index of the polymer product. The above reaction was continued until a 1,3-butyleneterephthalate cofumarate compound with a $T_g$ of 38° C. and Melt Flow Index of 15 at 105° C. using 2.16 Kg weight was obtained. The rheology of this linear condensation polymer is shown by curve A in FIG. 4. A toner was made from this linear polyester and 10% by weight of BP1300 carbon black. This toner had a $T_g$ of 45° C. and the toner blocked at ambient conditions in the container.

EXAMPLE IV

Unsaturated base polyester, 49.4 parts, as described and prepared in Example III was crosslinked with a mixture of 49.4 parts of a mixture of styrene (77 weight %) and butyl acrylate (23 weight %) and 1.2 weight percent benzoyl peroxide initiator. This polymer showed two $T_g$ values of 35 and 51. The melt rheology for this crosslinked material is shown by curve B in FIG. 4. A toner was made according to the procedure of Example I from a mixture of this crosslinked polyester and 10% by weight of BP1300 carbon black. The toner had a $T_g$ of 46 and 58 and had improved blocking properties. The blocking temperature for this toner was 115° F.

The disclosures of all the above mentioned patents and publications mentioned herein are incorporated by reference in their entirety.

Other modifications of the present invention may occur to those skilled in the art subsequent to a review of the present application. The aforementioned modifications, including equivalents thereof, are intended to be included within the scope of the present invention.

While this invention has been described with reference to particular preferred embodiments, the invention is not limited to the specific examples given, and other embodiments and modifications can be made by those skilled in the art without departing from the spirit and scope of the invention.

What is claimed is:

1. A reactive melt mixing process for preparing toner resin, comprising:
   (a) melting a reactive base resin, thereby forming a first polymer melt;
   (b) adding to said polymer melt a free radical initiator compound to form a second melt; and
   (c) heating and mixing under high shear said second melt to form a third melt containing a partially crosslinked and partially gelled toner resin and wherein a free radical reactive vinyl monomer compound is added to either (b) or (c) as a crosslinking component.

2. The process of claim 1, wherein said process is accomplished in a batch melt mixing process.

3. The process of claim 1, wherein said process is accomplished in a continuous melt mixing process.

4. The process of claim 1, wherein said process is accomplished in a reactor subsequent to formation of the base resin and wherein the base resin is formed by a condensation polymerization reaction.

5. The process of claim 1, wherein said reactive base resin is a linear unsaturated resin.

6. The process of claim 5, wherein said linear unsaturated resin is a polyester with a number average molecular weight ($M_n$) as measured by gel permeation chromatography (GPC) in the range from 1,000 to about 20,000, a weight average molecular weight ($M_w$) in the range from 2,000 to about 40,000, a molecular weight distribution ($M_w/M_n$) in the range from about 1.5 to about 6, an onset glass transition temperature ($T_g$) as measured by differential scanning calorimetry in the range from 50° C. to about 70° C., and a melt viscosity as measured with a mechanical viscometer at 10 radians per second from about 5,000 to about 200,000 poise at 100° C., said melt viscosity dropping with increasing temperature to about 100 to about 5,000 poise at 130° C.

7. The process of claim 5, wherein said linear unsaturated resin is a polyester prepared from (a) diacids, diesters or anhydrides selected from the group consisting of succinic acid, glutaric acid, adipic acid, pimelic acid, suberic acid, azelaic acid, sebacic acid, isophthalic acid, terephthalic acid, hexachloroendomethylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, maleic acid, fumaric acid, chloromaleic acid, itaconic acid, citraconic acid, mesaconic acid, maleic anhydride, and ester derivatives thereof, and mixtures thereof, and (b) diols selected from the group consisting of propylene glycol, ethylene glycol, diethylene glycol, neopentyl glycol, dipropylene glycol, dibromoneopentyl glycol, propoxylated bisphenol-A2,2,2,4-trimethylpentane-1,3-diol, tetrabromobisphenol dipropoxy ether, 1,4-butanediol, 1,3 butanediol, and mixtures thereof.

8. The process of claim 1, wherein said heating initiates crosslinking of the reactive resin by reaction with said free radical initiator compound selected from the group consisting of organic peroxides, azobisalkylnitriles, peroxycarbonates, and mixtures thereof.

9. The process of claim 1, further comprising diluting the free radical initiator with a diluent resin or wax component which is free of olefinic double bonds and which component is selected from the group consisting of a methyl terpolymer, a polyvinylidine fluoride, a polymethyl methacrylate, polystyrene, polystyrene acrylate copolymer, polystyrene methacrylate copolymer, hydrogenated poly(styrene-butadiene) copolymer, polyisobutylmethacrylate, polyacrylate, polymethacrylate, saturated polyester, polyvinyl chloride, and a wax component with a weight average molecular weight from about 1,000 to about 6,000, and mixtures thereof.

10. The process of claim 1, wherein said vinyl monomer compound is readily polymerized onto the base resin by free radical species located on the base resin thereby functioning as a grafting and subsequently a crosslinking agent, and is selected from the group consisting of styrene and derivatives thereof, conjugated dienes and derivatives thereof, acrylates and derivatives thereof, and mixtures thereof.

11. The process of claim 1, wherein the weight fraction of said free radical initiator compound to said base resin is from about 0.01 to about 10 percent.

12. The process of claim 9, wherein the weight fraction of said mixture of free radical initiator compound and optional vinyl monomer compound, with or without a diluent resin or wax, to said base resin is from about 2 to about 50 percent.

13. The process of claim 1, further comprising mixing said reactive base resin and said free radical initiator compound and optionally said vinyl monomer prior to forming said polymer melt.

14. The process of claim 1, further comprising mixing said free radical initiator compound and optionally said vinyl monomer into said polymer melt at a temperature less than about the onset of crosslinking temperature ($T_c$), thereby producing uniform dispersion of the initiator in said polymer melt prior to crosslinking of said polymer melt.

15. The process of claim 14, further comprising initiating crosslinking of said polymer melt with said mixture of free radical initiator and optionally said vinyl monomer by raising the temperature of said polymer melt above about the onset of crosslinking temperature ($T_c$), and maintaining the temperature in the range of about 130° to about 200° C. of said polymer melt during said crosslinking.

16. The process of claim 14, further comprising the step of initiating crosslinking of said polymer melt with said mixture of free radical initiator compound and optionally said vinyl monomer by raising the temperature of said polymer melt above about the onset of crosslinking temperature ($T_c$) and within 150° C. of the base resin melting temperature, and maintaining the temperature in the range of about 130° to about 200° C. of said polymer melt during said crosslinking.

17. The process of claim 1, wherein said heating leading to free radical addition polymerization type crosslinking is effected to completion.

18. The process of claim 1, wherein said heating and mixing is accomplished in an extruder.

19. The process of claim 5, wherein said linear unsaturated resin is a polyester of a propoxylated bisphenol A fumarate.

20. The process of claim 9, further comprising preblending said reactive base resin and a free radical initiator compound optionally in admixture with a vinyl monomer and an unreactive diluent resin or wax to form a preblend, and feeding said preblend, and optionally additional base resin and optionally additional free radical initiator compound to a continuous melt mixing apparatus.

21. The process of claim 20, further comprising preblending said reactive base resin and a free radical initiator compound, optionally in admixture with a vinyl monomer and an unreactive diluent resin or wax, to form a preblend, and feeding said preblend, and optionally additional free radical initiator compound initiator to a batch internal melt mixing apparatus.

22. The process of claim 1, wherein said resulting toner resin is a polyester resin comprising crosslinked portions and linear portions, wherein said crosslinked portions comprise high molecular weight microgel particles with a gel content of about 0.1 to about 40 weight percent, wherein said gel particles are less than about 0.2 micron in primary particle size diameter and are substantially uniformly distributed in said resin, and wherein said linear portions are linear unsaturated polyesters having a number average molecular weight ($M_n$) as measured by gel permeation chromatography in a range of from about 1,000 to about 20,000, a weight average molecular weight ($M_w$) of from about 2,000 to about 40,000, a molecular weight distribution ($M_w/M_n$) of about 1.5 to about 6, a glass transition temperature ($T_g$) as measured by differential scanning calorimetry in the range of from about 50° C. to about 70° C., and a melt viscosity as measured with a mechanical viscometer at 10 radians per second from about 5,000 to about 200,000 poise at 100° C., said melt viscosity dropping with increasing temperature to about 100 to about 5,000 poise at 130° C.

23. The process of claim 1, wherein said resulting toner resin is a polyester resin comprising vinyl monomer crosslinked portions and linear polyester portions, wherein said crosslinked portions are in the form of microgels less than about 0.2 micron in primary particle size diameter and are substantially uniformly distributed in said resin, wherein the amount of crosslinked portions or gel content is in the range from about 0.001 to about 50 percent by weight of said toner resin, wherein the amount of reactive linear resin is in the range of about 50 to about 99.999 percent by weight of said toner resin, and wherein said toner resin has a glass transition temperature in the range from about 50° C. to about 70° C., and melt viscosity at 10 radians per second from about 5,000 to about 200,000 poise at 100° C. and from about 10 to about 20,000 poise at 160° C.

24. The process of claim 1, wherein said toner resin provides a minimum fix temperature of a toner comprised of said resin and pigment from about 100° C. to about 160° C., a hot offset temperature of from about 110° C. to about 220° C., and which toner has substantially no vinyl offset.

25. The process of claim 1, further comprising the step of forming solid toner particles from said crosslinked toner resin.

26. The process of claim 25, further comprising the step of combining carrier particles with said toner particles to form a developer.

27. The process of claim 1, wherein said toner resin is combined with at least one member selected from the group consisting of a colorant, a charge control additive, a surfactant, an emulsifier, and a pigment dispersant to form a mixture, and said mixture is further melt blended to form a toner.

28. The process of claim 27, wherein said colorant is selected from the group consisting of cyan, magenta, yellow, red, green, blue, carbon black, and magnetite, and mixtures thereof.

29. The process of claim 27, wherein said charge control additive is selected from the group consisting of alkyl pyridinium halides, distearyl dimethyl ammonium methyl sulfate, and metallic alkyl salicylates, and mixtures thereof.

30. The process of claim 1, wherein substantially all of said crosslinking is accomplished under high shear mixing and heating.

31. The process of claim 1, wherein free radical initiator compound has a half life of about one hour at a temperature from about 80° C. to about 170° C.

32. A reactive melt mixing process for preparing a low fix temperature toner resin, comprising: preblending a reactive base resin, a high temperature half life free radical initiator compound and optionally an unreactive resin or wax as a free radical initiator diluent; feeding the mixture to an extruder; heating the mixture at a temperature of from about 70° C. to about 120° C. to melt the base resin and to further disperse the free radical initiator therein but without significant free radical initiator degradation or; simultaneously adding to the melt mixture a vinyl monomer for forming crosslinked segments comprised of said vinyl monomers between adjacent reactive resin molecules; heating to a higher temperature of from about 130° C. to about 200° C. to cause free radical initiator degradation; retaining the polymer melt in the extruder for a sufficient residence time of from about 10 seconds to about 10 minutes to complete the crosslinking; providing sufficiently high shear during the vinyl monomer interchain crosslinking reaction thereby keeping the gel particles formed during crosslinking small in size and well distributed in the polymer melt; optionally devolatilizing the melt to remove any effluent volatiles; and pumping the crosslinked resin melt through a die to a pelletizer.

33. A process in accordance with claim 1 wherein the vinyl monomer to free radical initiator mole ratio is from about 1:1 to about 10,000:1.

34. A process in accordance with claim 1 wherein the weight fraction of vinyl monomer to the base resin is from about 1.0 to about 40 percent.

35. A process in accordance with claim 9 wherein the weight fraction of the diluent resin or wax component to the free radical initiator compound is from about 20 to about 300 percent.

* * * * *